US011556778B2

(12) United States Patent
Dey et al.

(10) Patent No.: US 11,556,778 B2
(45) Date of Patent: Jan. 17, 2023

(54) AUTOMATED GENERATION OF MACHINE LEARNING MODELS

(71) Applicant: Microsoft Technology Licensing, LLC, Redmond, WA (US)

(72) Inventors: Debadeepta Dey, Kenmore, WA (US); Hanzhang Hu, Pittsburg, PA (US); Richard A. Caruana, Woodinville, WA (US); John C. Langford, Scarsdale, NY (US); Eric J. Horvitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 16/213,470

(22) Filed: Dec. 7, 2018

(65) Prior Publication Data
US 2020/0184327 A1  Jun. 11, 2020

(51) Int. Cl.
*G06N 3/08* (2006.01)
*G06N 20/00* (2019.01)

(52) U.S. Cl.
CPC ............. *G06N 3/08* (2013.01); *G06N 3/086* (2013.01); *G06N 20/00* (2019.01)

(58) Field of Classification Search
CPC .......... G06N 3/08; G06N 20/00; G06N 3/086
See application file for complete search history.

(56) References Cited

U.S. PATENT DOCUMENTS

| 2018/0018555 | A1* | 1/2018 | Wong | G06N 3/08 |
| 2018/0336453 | A1* | 11/2018 | Merity | G06N 3/0445 |
| 2018/0365557 | A1* | 12/2018 | Kobayashi | G06N 3/126 |
| 2019/0180181 | A1* | 6/2019 | Lilley | G06N 3/082 |
| 2020/0342324 | A1* | 10/2020 | Sivaraman | G06K 9/627 |

OTHER PUBLICATIONS

Zoph, Barret, and Quoc V. Le. "Neural architecture search with reinforcement learning." arXiv preprint arXiv:1611.01578 (2016). (Year: 2016).*
Zoph et al., "Learning Transferable Architectures for Scalable Image Recognition", Apr. 2018, arXiv:1707.07012v4, 14 Pages. (Year: 2018).*
T. Murata and H. Ishibuchi, "MOGA: Multi-objective genetic algorithms," Proc. of 1995 IEEE International Conference on Evolutionary Computation, pp. 289-294, Perth, Australia, Nov. 1995 (Year: 1995).*

(Continued)

*Primary Examiner* — Abdullah Al Kawsar
*Assistant Examiner* — Asher H. Jablon
(74) *Attorney, Agent, or Firm* — Rainier Patents, P.S.

(57) ABSTRACT

This document relates to automated generation of machine learning models, such as neural networks. One example system includes a hardware processing unit and a storage resource. The storage resource can store computer-readable instructions cause the hardware processing unit to perform an iterative model-growing process that involves modifying parent models to obtain child models. The iterative model-growing process can also include selecting candidate layers to include in the child models based at least on weights learned in an initialization process of the candidate layers. The system can also output a final model selected from the child models.

22 Claims, 11 Drawing Sheets

(56) References Cited

OTHER PUBLICATIONS

Miikkulainen et al., "Evolving Deep Neural Networks", Mar. 1, 2017, arXiv:1703.00548v2, pp. 1-8 (Year: 2017).*
Bolukbasi, Tolga, et al. "Adaptive neural networks for fast test-time prediction." arXiv:1702.07811v2. Sep. 18, 2017. (Year: 2017).*
Justus et al. "Predicting the Computational Cost of Deep Learning Models." Nov. 28, 2018. arXiv:1811.11880v1 (Year: 2018).*
Prellberg, et al., "Lamarckian Evolution of Convolutional Neural Networks", In Journal of Computing Research Repository, Jun. 21, 2018, 12 Pages. (Year: 2018).*
Loni et al. "ADONN: Adaptive design of optimized deep neural networks for embedded systems." 2018 21st Euromicro Conference on Digital System Design (DSD). IEEE, 2018. pp. 397-404. Added to IEEE Xplore Oct. 15, 2018. (Year: 2018).*
Sun et al. "Automatically Evolving CNN Architectures Based on Blocks." arXiv:1810.11875v1. Oct. 28, 2018. (Year: 2018).*
Yosinski et al. "How transferable are features in deep neural networks?" 2014. arXiv:1411.1792v1 [cs.LG]. 5 pages (Year: 2014).*
Szenkovits et al., "Feature Selection with a Genetic Algorithm for Classification of Brain Imaging Data", Nov. 16, 2017, In Advances in Feature Selection for Data and Pattern Recognition, vol. 138 of Intelligent Systems Reference Library, Springer, pp. 184-202. (Year: 2017).*
Roy et al. "Tree-CNN: A Hierarchical Deep Convolutional Neural Network for Incremental Learning." May 23, 2018. arXiv: 1802.05800v2 [cs.CV]. 12 pages (Year: 2018).*
Li et al., "Continual Learning via Explicit Structure Learning", Nov. 26, 2018, OpenReview, revision imported Nov. 26, 2018, URL: https://openreview.net/revisions?id=ryxsS3A5Km (Year: 2018).*
Elsken, Thomas, et al., "Neural Architecture Search: A Survey", In Repository of arXiv:1808.05377, 21 Pages.
Hsu, Chi-Hung, et al., "MONAS: Multi-Objective Neural Architecture Search using Reinforcement Learning", In Repository of arXiv:1806.10332, 2018, 8 Pages.
Hu, Hanzhang, et al., "Efficient Forward Architecture Search", In Repository of arXiv:1905.13360v1, May 31, 2019, 14 Pages.
Hu, Hanzhang, et al., "Macro Neural Architecture Search Revisited", In Proceedings of 2nd Workshop on Meta-Learning at NeurIPS 2018, Montreal, Canada., 2018, 6 Pages.
Liu, Hanxiao, et al., "DARTS: Differentiable Architecture Search", In Repository of arXiv:1806.09055, Jun. 24, 2018, 14 Pages.
Liu, Hanxiao, et al., "Hierarchical Representations for Efficient Architecture Search", In Repository of arXiv:1711.00436, Nov. 2017, 13 Pages.
"International Search Report and Written Opinion Issued in PCT Application No. PCT/US2019/059353", dated Feb. 28, 2020, 13 Pages.
Prellberg, et al., "Lamarckian Evolution of Convolutional Neural Networks", In Journal of Computing Research Repository, Jun. 21, 2018, 12 Pages.
Real, et al., "Large-Scale Evolution of Image Classifiers", In Journal of Computing Research Repository, Mar. 3, 2017, 10 Pages.
Elsken, Thomas, et al., "Efficient multi-objective neural architecture search via lamarckian evolution", In Repository of arXiv:1804.09081, Apr. 24, 2018, 23 Pages.
Huang, Gao, et al., "CondenseNet: An Efficient DenseNet Using Learned Group Convolutions", In Proceedings of The IEEE Conference on Computer Vision and Pattern Recognition (CVPR), Jun. 18, 2018, pp. 2752-2761.
Pham, et al., "Efficient neural architecture search via parameter sharing", In Repository of arxiv:1802.03268, Feb. 9, 2018, 11 Pages.
Real, E., et al., "Regularized evolution for image classifier architecture search", In Proceedings of the AAAI conference on artificial intelligence, vol. 33, Jul. 17, 2019, pp. 4780-4789.
Elsken, et al., "Neural Architecture Search: A Survey", In Repository of arXiv:1808.05377v1, Aug. 16, 2018, 16 Pages.
Hsu, et al., "MONAS: Multi-Objective Neural Architecture Search using Reinforcement Learning", In Repository of arXiv:1806.10332v1, Jun. 27, 2018, 8 Pages.
Hu, et al., "Macro Neural Architecture Search Revisited", In Proceedings of 2nd Workshop on Meta-Learning at NeurIPS, Dec. 8, 2018, 6 Pages.
Liu, et al., "DARTS: Differentiable Architecture Search", In Repository of arXiv:1806.09055v1, Jun. 24, 2018, 12 Pages.
"Notice of Allowance Issued in South African Patent Application No. 2021/03317", dated Jun. 1, 2022, 1 Page.

* cited by examiner

AUTOMATED GENERATION OF MACHINE LEARNING MODELS

BACKGROUND

Traditionally, machine learning models were manually constructed by experts who would define a structure of the model and then use automated techniques for model training. As machine learning models have grown more complex, various attempts have been made to automate the process of generating machine learning models. However, these efforts have met with limited success.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for automated generation of machine learning models. One example includes a method or technique that can be performed on a computing device. The method or technique can include performing two or more iterations of an iterative model-growing process. The iterative model-growing process can include selecting a particular parent model from a parent model pool of one or more parent models, generating a plurality of candidate layers, and initializing the plurality of candidate layers while reusing learned parameters and/or structure of the particular parent model. The iterative model-growing process can also include selecting particular candidate components such as layers to include in child models for training. Respective child models can include the particular parent model and one or more of the particular candidate layers or other structures. The iterative model-growing process can also include training the plurality of child models to obtain trained child models, and evaluating the trained child models using one or more criteria. The iterative model-growing process can also include designating an individual trained child model as a new parent model based at least on the evaluating and adding the new parent model to the parent model pool. The method or technique can also include selecting at least one trained child model as a final model after the two or more iterations, and outputting the final model.

Another example includes a system that entails a hardware processing unit and a storage resource. The storage resource can store computer-readable instructions which, when executed by the hardware processing unit, cause the hardware processing unit to perform an iterative model-growing process that involves modifying parent models to obtain child models. The iterative model-growing process can include selecting candidate layers to include in the child models based at least on weights learned in an initialization process of the candidate layers. The computer-readable instructions can also cause the hardware processing unit to output a final model selected from the child models.

Another example includes a computer-readable storage medium storing instructions which, when executed by a processing device, cause the processing device to perform acts. The acts can include performing two or more iterations of an iterative model-growing process. The iterative model-growing process can include selecting a particular parent model from a parent model pool of one or more parent models, initializing a plurality of candidate layers, and selecting a plurality of child models for training. Respective child models can include a structure inherited from the particular parent model and at least one of the candidate layers. The iterative model-growing process can also include training the plurality of child models to obtain trained child models, and designating an individual trained child model as a new parent model based at least on one or more criteria. The iterative model-growing process can also include adding the new parent model to the parent model pool. The acts can also include selecting at least one trained child model as a final model after the two or more iterations, and outputting the final model.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
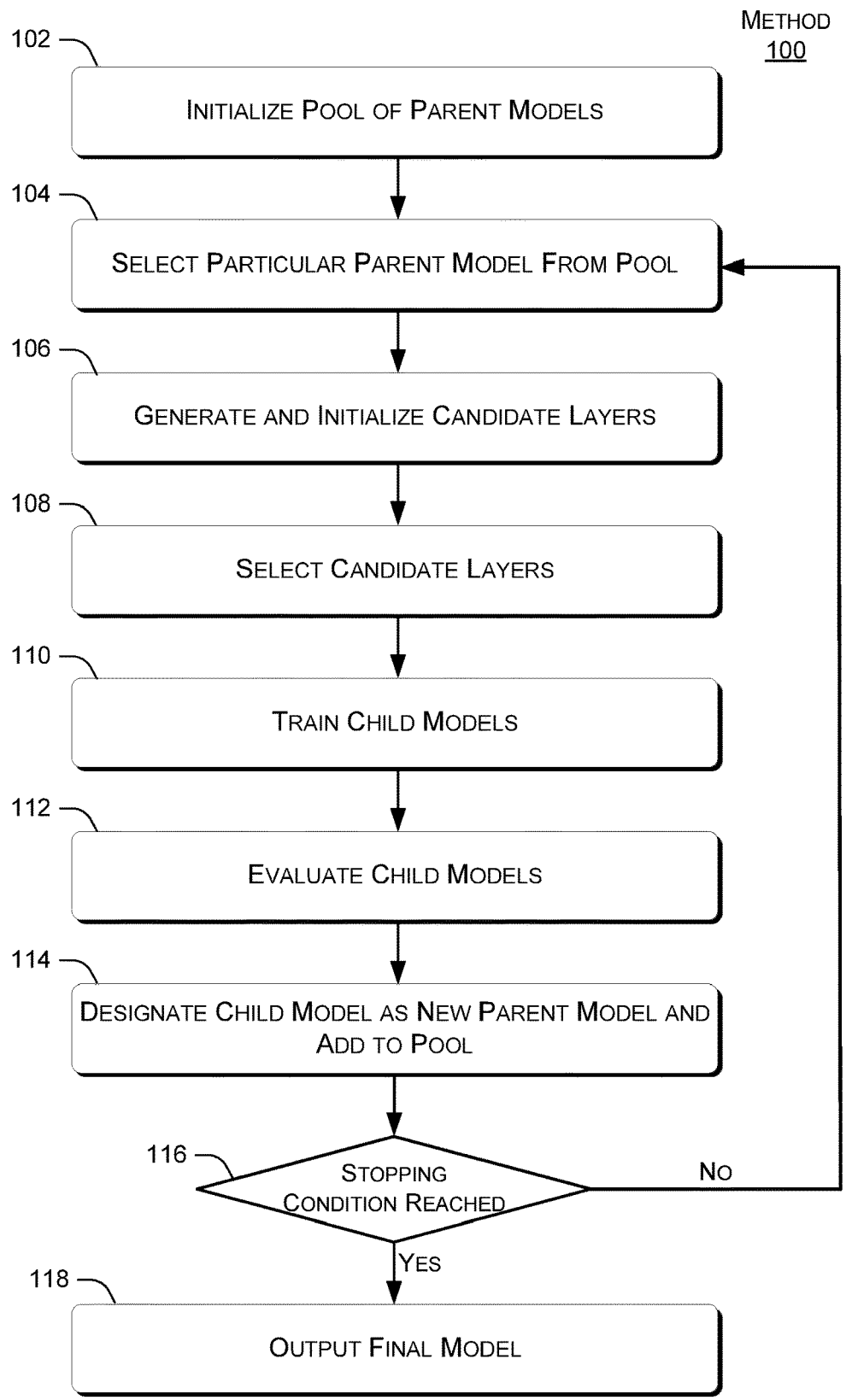
FIG. 1 illustrates an example method or technique for automated generation of machine learning models, consistent with some implementations of the present concepts.

There are various types of machine learning frameworks that can be trained using supervised and/or unsupervised learning. Support vector machines, decision trees, and neural networks are just a few examples of machine learning frameworks that are suited to supervised learning, where the models can learn from labeled training data. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. For the purposes of this document, the term "learned parameters" refers to parameters such as edges and bias values that are learned by training a layered machine learning model, such as a neural network.

A neural network structure can be constructed in a modular fashion. For example, one or more layers of nodes can collectively perform a specific operation, such as a pooling or convolution operation. Then, different layers can be connected together to form the overall network structure. For the purposes of this document, the term "layer" refers to a group of nodes that share connectivity to one or more input layers and one or more target layers that receive output from the nodes in that layer. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The disclosed implementations primarily use neural network structures as example model structures for layered machine learning models. The term "trained model" refers to a model structure together with learned parameters for the model structure. Note that two trained models can share the same model structure and yet have different learned parameters, e.g., if the two models trained on different training data or if there are underlying stochastic processes in the training process.

As previously noted, one way to generate a model structure is for a human to manually define the model structure. Then, the model structure can be trained on some training data set by a computer to obtain a trained model, and then the trained model can be validated using a validation data set. Subsequently, modifications to the model structure can be generated manually, e.g., by adding or removing layers or connections between layers. Then, the modified structures can be trained again from scratch to obtain additional trained models, and the additional trained models can be compared to one another to select a final model and corresponding structure that works well for a given task. However, this approach requires the involvement of a human with domain expertise to create the initial model structure and the modifications, and also to select the final model structure.

Another approach is to automate the process by using a computer to generate different model structures and to select a final model structure from among the generated structures. However, previous efforts to automate the generation of model structures have met with limited success. Although modern computers have advanced tremendously in computational capability, existing approaches to automated generation of model structures, such as neural network structures, tend to either explore limited search spaces or require impractical amounts of computational resources. In practice, generating model structures tends to be computationally feasible, but independently training many different model structures tends to be computationally infeasible given currently-available computing hardware.

One way to quantify the training time for a model structure is by defining a reference computational resource, such as a virtual machine or a processor, and an amount of time that training takes to complete on the reference computational resource. For example, one day of training on a specific type of graphics processing unit ("GPU") can be referred to as a GPU-day, and the computational cost of training a given model can be specified as a number of GPU-days. Other approaches are also possible, e.g., the number of training hours on a particular CPU or FPGA model, the amount of time spent on a virtual machine, etc.

One approach to automating the generation of model structures is to simply define a search space and generate all model structures within the search space. Then, all of the possible model structures can be trained independently to obtain trained models, and one of the trained models can be selected as a final model. Generally, the search space can be defined by restricting the depth of the model structure, the operations performed by the model, and the connectivity of the model. For example, a computer could be programmed to consider all fully-connected model structures of depth five, where each of the five layers performs one of several possible operations.

However, this approach is not feasible for many models. First, model structures can grow very large, with many different layers and nodes. Second, training can take a very long time for such large model structures. Finally, this approach does not consider other model structures outside of the search space that might be better-suited to the task at hand. For example, if the task is image recognition and a six-layer model is significantly better for this task than any plausible five-layer model, the six-layer model will not be found if the search space is restricted to five layers.

A more sophisticated approach to automated generation of model structures involves the creation of a separate "controller" model that is trained to generate new model structures for a given task. However, previous efforts to use controller models to generate new model structures still suffer from some of the drawbacks noted above. If a large search space is considered, e.g., the controller model is expected to consider a wide range of potential model structures, each model structure needs to be generated, fully trained, and then evaluated relative to other models. Because training can take days on large data sets, efforts to automate learning of new model structures with relatively unconstrained search spaces have met limited success. For example, such approaches can take hundreds or thousands of GPU-days to output a final model structure with acceptable levels of performance.

Another approach to automated generation of model structures is to constrain the search space significantly and then search among a relatively limited set of models within the constrained search space. For example, some previous approaches define an outer model skeleton having a specified number of modularized layers and types of connections between the modules. These approaches then generate and evaluate different candidate sub-structures or "cells," which are then repeated within the outer model skeletons. However, these approaches do not consider alternative outer skeletons, alternative connections between the cells, or using different types of sub-structures in each cell.

In contrast to the deficiencies of conventional techniques outlined above, the disclosed implementations can generate model structures in a relatively unconstrained search space while saving significant training time relative to the techniques discussed above. By considering a broad search space, the disclosed implementations can potentially find new model structures that offer better performance than might be possible in a more constrained search space. For example, the disclosed implementations can find model structures that are not limited to a predefined outer skeleton, and can also find model structures that have varying types of operations in different layers of the model.

The disclosed implementations can utilize several techniques to avoid separately generating and training every model structure in the search space. Instead, the disclosed implementations guide the growth of new model structures toward a portion of the search space that is expected to contain improved model structures relative to those structures that have already been evaluated, while avoiding searching other portions of the search space that are less likely to contain improved model structures.

Model Structure Generation Method

The following discussion presents an overview of functionality that can allow automated generation of model structures, such as neural network structures, to be performed. FIG. 1 illustrates an example method 100, consistent with the present concepts. As discussed in more below, method 100 can be implemented on many different types of devices, e.g., by one or more cloud servers, by a client device such as a laptop, tablet, or smartphone, or by combinations of one or more servers, client devices, etc.

Method 100 begins at block 102, where a pool of parent models is initialized. For example, one or more initial parent models can be added to the pool of parent models. The initial parent models can be known models that have previously been determined to perform well at a specific task, can be randomly generated, or can simply be predefined default seed models.

Method 100 continues at block 104, where a particular parent model is selected from the pool. For example, parent models can be selected from the pool randomly or deterministically. The particular parent model has a corresponding model structure that can be modified, as discussed in more below.

Method 100 continues at block 106, where candidate layers are generated and initialized. Generally, generating a candidate layer can include selecting one or more layers of the particular parent model to provide inputs to the candidate layer, and selecting another "target" layer of the particular parent model to receive outputs of the candidate layer. Thus, the candidate layers can be considered as additions to the structure of the particular parent model. In addition, generating a candidate layer can include selecting operations to perform on the inputs provided by the selected layers of the particular parent model. Initializing a candidate layer can include performing some initial training on the candidate layer, as discussed further herein.

Method 100 continues at block 108, where particular candidate layers are selected to include in one or more child models derived from the parent model. For example, the particular candidate layers can be selected based on initialized parameters learned when initializing the candidate layers, as discussed in more detail below. In other cases, each of the candidate layers is selected for inclusion in a child model. In either case, a child model can be considered a model that inherits the parent model structure and additionally includes one or more of the selected candidate layers.

Method 100 continues at block 110, where the child models are trained. In some cases, the child models are trained by reusing learned parameters from the parent models, as discussed in more detail below. In these cases, the child models can also be considered to initially inherit learned parameters from the parent model, although these learned parameters may be further adjusted during training of the child models.

Method 100 continues at block 112, where the trained child models are evaluated according to one or more criteria. Generally, the criteria can relate to the performance of the model at a given task, e.g., accuracy, and/or other factors, such as the computational cost of training the child model.

Method 100 continues at block 114, where an individual child model is designated as a new parent model based on the evaluating at block 112. The new parent model is added to the parent model pool.

Method 100 continues at decision block 116, where a determination is made whether a stopping condition has been reached. The stopping condition can define a specified amount of computational resources to be used (e.g., a budget in GPU-days), a specified performance criteria (e.g., a threshold accuracy), a specified amount of time, etc.

If the stopping condition has not been reached, the method continues at block 104, where subsequent iterations of blocks 104-116 can be performed. Generally speaking, blocks 104-116 can be considered an iterative model-growing process that can be repeated over multiple iterations until a stopping condition is reached.

If the stopping condition has been reached, the method moves to block 118, where a final model is output. For example, the final model can be selected from all of the child models according to one or more criteria, such as those discussed above with respect to block 112.

In many cases, method 100 is performed to generate models that are well-suited for a specific application. For example, in a facial recognition scenario, the training data could include labeled examples of images, indicating whether faces are included in the images and also where the faces are located in the images. In a scene segmentation example, the training data could include labeled examples of video that has been segmented into predetermined segments. By iteratively generating new child models and evaluating them against a training data set for a specific task, method 100 can output a final model that performs well at that specific task.

Candidate Layer Generation

Figure 2:
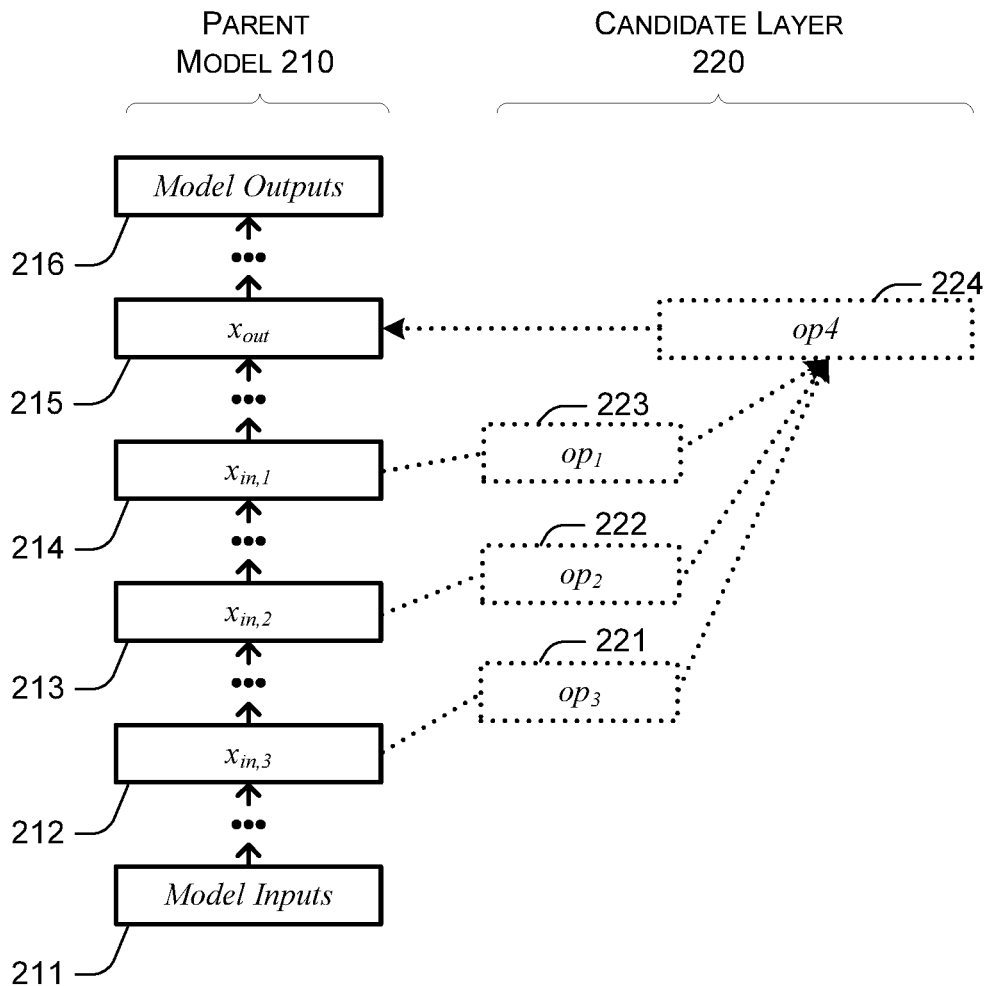
FIG. 2 illustrates an example approach for generating candidate layers of a machine learning model, consistent with some implementations of the present concepts.

FIG. 2 shows a parent model 210 and a candidate layer 220. The following describes an example of how candidate layers can be derived from parent model structures. Note that FIG. 2 represents an approach for generating multiple candidate layers from a given parent model, rather than single instances of a parent model and a candidate layer, as discussed in more detail below.

In FIG. 2, elements of the parent model are shown in solid lines, and elements of the candidate layer are shown in dotted lines. In this case, the parent model includes model inputs 211, layers 212, 213, 214, and 215, and model outputs 216. The parent model can also include one or more other layers that are not shown, represented by the ellipses shown in FIG. 2. Generally, the model inputs can include features that are processed by the model, such as raw image, video, audio, and/or text data. The outputs can represent computational results of the model, e.g., identification of faces in images, segmented video, transcribed audio, semantic representations of text, etc.

In this example, the candidate layer includes individual operations 221, 222, and 223 and aggregate operation 224. Generally, individual operations 221, 223, and 223 can involve convolutions, pooling, etc., as discussed further herein. Aggregate operation 224 can involve manipulating outputs of the individual operations to conform to a target layer of the parent model that will receive output from the aggregate operation, e.g., layer 215. For example, the aggregate operation can concatenate the outputs of the individual operations and project them into a form or shape that matches the input of the target layer.

As discussed above, block 106 of method 100 can be used to generate candidate layers. Generating candidate layers can involve selecting one or more input layers from the parent model, selecting one or more target layers of the parent model to receive the outputs of the candidate layer, and selecting one or more operations to be performed by the candidate layer on the inputs. In addition, generating candidate layers can include selecting operational parameters of the operations, e.g., convolution sizes, convolution strides, pooling windows, etc.

In this example, the search space of possible candidate layers can be defined as follows. Let be all the existing layers in the parent model. A candidate layer can be defined by a tuple $(x_{out}, x_{in,1}, op_1, x_{in,2}, op_2, \ldots, x_{in,J}, op_J)$, where J is a positive integer, $x_{out}, x_{in,1}, \ldots, x_{in,K}$ are existing layers and $op_1, \ldots, op_J$ are operations such as convolutions and pooling. $x_{out}$ can be defined as strictly behind all $x_{in,i}$ in topological order of the parent model computational graph, so no direct cycle can be formed. A candidate layer can be computed from $x_c = \sum_{i=1}^{J} op_i(x_{in,i})$, and then added to obtain inputs from one or more input layers and provide its output to $x_{out}$.

One specific algorithm for forming a candidate layer $x_c$ is as follows. First, randomly sample a target layer $x_{out}$ from layers that were in the parent model 210. Next, three input layers $x_{in,i}$ for i=1, 2, 3 can be chosen. To ensure that $x_c$ has access to local layers, $x_{in,1}$ can be selected as the deepest input of $x_{out}$ that was in the initial parent model. $x_{in,2}$ and $x_{in,3}$ can be sampled with replacement uniformly at random from all layers of the parent model that are topologically earlier than $x_{out}$. Next, operations to be performed on each input layer can be selected uniformly at random from a group of operations.

For example, the group of operations can be predefined. Specific examples of operations include convolution, pooling, and identity operations. Each type of operation can have different operation parameters. For example, convolution operations can have specified kernel size parameters—1×1, 3×3, 5×5, 7×7, etc. Convolutions can also have a filter size parameter, e.g., 16, 32, or 64 filters and so on, as well as stride parameters, padding parameters, etc. Pooling operations can include max and average pooling operations, and can be applied over a window that varies based on a window size parameter. Generally, these parameters are referred to herein as "operation parameters" to distinguish them from "learned parameters" such as weights and bias values obtained via model training. Generating candidate layers can include selecting different operations and/or different operation parameters, deterministically or at random.

In some implementations, separable convolutions can be applied twice. The outputs of each operation can be concatenated together via aggregate operation 224 and then projected to the same shape as the target layer $x_{out}$ using a 1×1 convolution. The result is the candidate layer $x_c$.

Some implementations may constrain the connectivity of the candidate layer to reduce the search space. At depth i in a given parent model, there are i−1 potential earlier layers and any subset of the earlier layers can be chosen as inputs to the candidate layer. As a consequence, there are an exponential number of choices of inputs to the candidate layer. Hence, some implementations can limit the input options by learning only a repeatable cell module and deploying the cell to a manually designed skeleton macro structure. In these implementations, layers in cell modules can only take input from other layers in the same cell and from the outputs of the two most recent previous cells. Other implementations are not limited to any particular skeleton or connectivity arrangement, and can allow sparse skip connections among arbitrary layers of a model skeleton that varies as the model structure grows.

Block 106 of method 100 can involve generating one or more candidate layers using the approach discussed above for each iteration of the method. In some cases, model structures can include thousands or millions of different layers that are connected in any number of different combinations, and thus the number of potential candidate layers that can be generated from a single parent model in a single iteration can be large. The following discusses some approaches that can reduce the computational burden of independently training the entire space of possible child model structures.

Candidate Layer Initialization

As noted above, block 106 of method 100 can also include initializing candidate layers. Generally, candidate layer initialization can serve several purposes. First, initializing the parameters of candidate layers allows child models to be trained starting from the initialization, rather than from scratch. In other words, the child models are already partially trained when final training occurs in block 110 of method 100. Second, candidate layer initialization can provide information about the candidate layers so that candidate layers can be selectively added to the parent models while omitting other candidate layers, as discussed more below.

Figure 3:
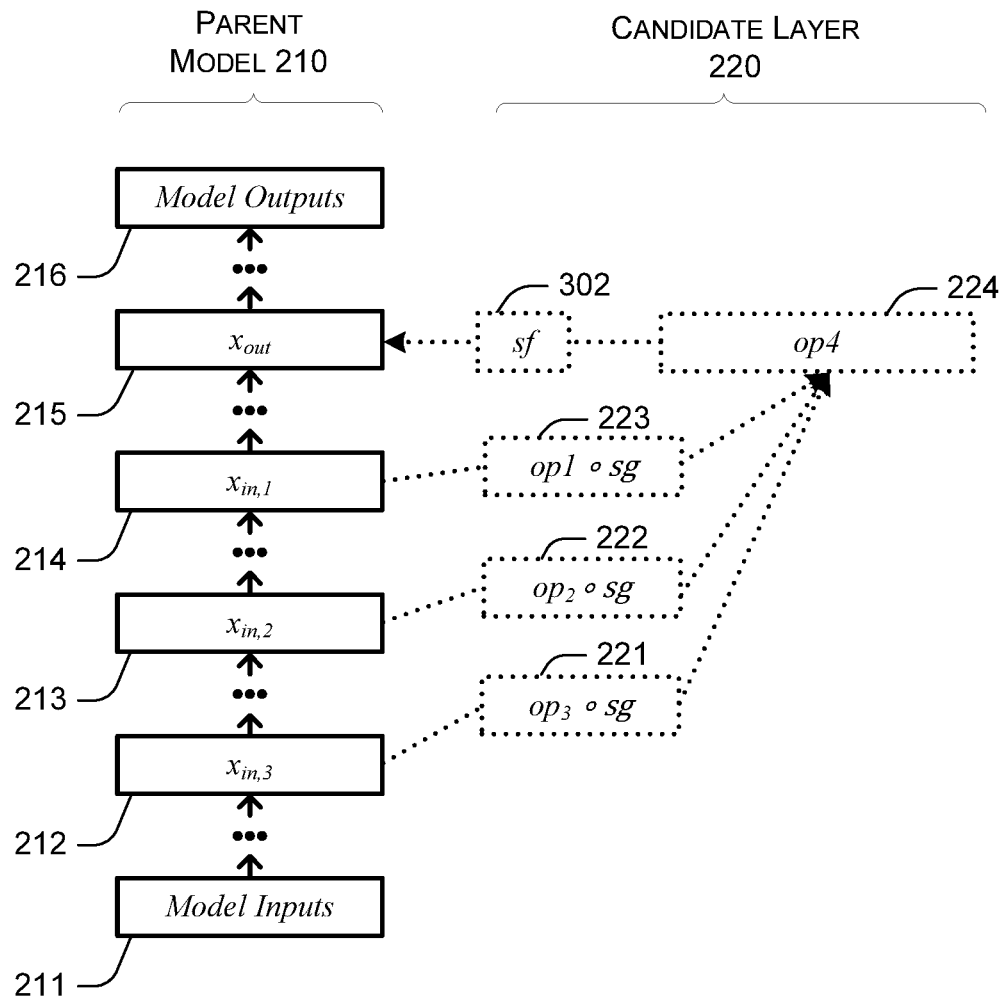
FIG. 3 illustrates an example approach for initializing candidate layers of a machine learning model, consistent with some implementations of the present concepts.

FIG. 3 illustrates exemplary initialization operations for an implementation where candidate layer 220 is trained by initially preventing the candidate layer from affecting the parent model 210. To do so, operations 221, 222, and 223 can be augmented with a stop-gradient operation (sg) that is applied to the respective inputs of each operation. sg(x) is x during forward propagation and is zero during backpropagation. During backpropagation, gradients are computed for each layer to adjust the learned parameters of the model. The sg operation prevents the gradient from affecting any of the learned parameters in any preceding layer of the parent model.

A stop-forward (sf) operation 302 can be applied to the output of aggregate operation 224 before the output is provided to target layer 215. Here, sf(x) is zero during forward propagation, and is the identity function during backward propagation. This allows the candidate layer 220 to receive the gradient information during initialization without affecting the target layer. Hence, during initialization, the candidate layer can accumulate the gradient of the loss with respect to the target layer, without actually affecting the values output by the target layer or any subsequent outputs.

Thus, in candidate layer initialization, the learned parameters of the parent model can remain stable while determining initialized values of the learned parameters for the candidate layer. In some cases, different candidate layers generated in the same iteration can share edges. When this is the case, weights for the shared edges can be initialized and/or trained independently for each candidate layer. Alternatively, the initialization and/or training can be performed so that different candidate layers share weights for edges that they have in common. For example, forward propagation and backpropagation operations can be shared during initialization and/or training of shared edges, and performed independently for other edges that are not shared between candidate layers. Significant savings in computational costs can be obtained by shared initialization and/or training of edges in a given candidate layer and/or child model.

Pruning Candidate Layers

In some cases, block 108 of method 100 can involve selecting all of the candidate layers generated in block 106 for inclusion in child models for subsequent training and evaluation. When this is the case, method 100 can still provide significant benefits relative to prior techniques, because only certain child models are designated as parent models in block 114. As a consequence, the child models in each iteration are derived from known good parent models. This approach allows a significant portion of the search space to be omitted when growing new child models.

However, depending on the potential operations, operation parameters, and types of connectivity under consideration, the number of possible candidate layers at any given iteration can be very large. Thus, the number of possible immediate children models of a given parent can be large. As a further refinement to reduce the computational burden of training of new child models, some implementations can filter out certain candidate layers prior to training the child models in block 110. This can further reduce the space of child models that need to be trained and evaluated in each iteration, as discussed above.

One approach to reduce the number of children for training is to randomly sample the possible candidate layers at block 108 of method 100, so that fewer children need to be trained. In other implementations, block 108 can involve using initialized parameters of candidate layers to determine which candidate layers should be incorporated into child models for training. Consider a scenario where multiple candidate layers share connectivity to one or more input layers and a target layer of a given parent model, yet perform different operations. Different weights can be initialized for the edges of the candidate layers that are input and/or output by the different operations. These initialized weights can be used to select certain candidate layers to include in child models for further training. Other candidate layers can be pruned out so that no child models with these candidate layers are trained, thus saving additional training time.

Figure 4:
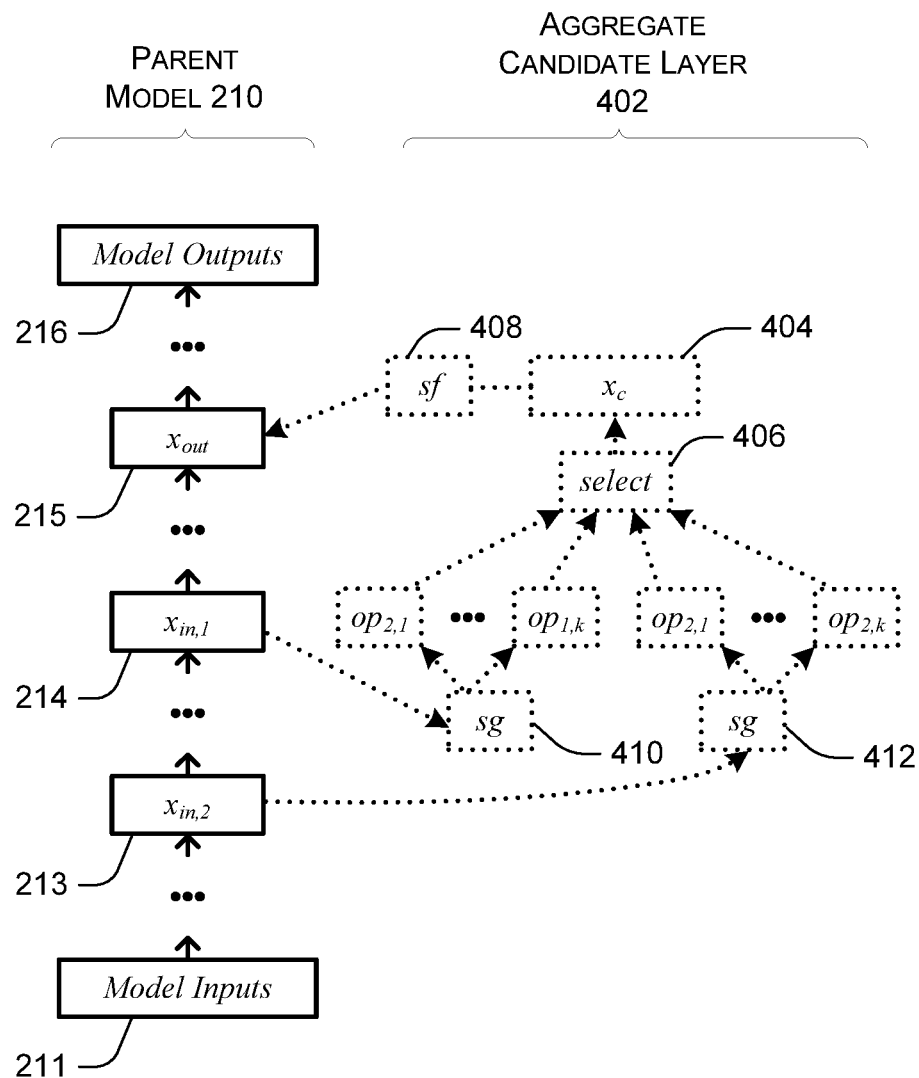
FIG. 4 illustrates another example approach for initializing candidate layers of a machine learning model, consistent with some implementations of the present concepts.

FIG. 4 illustrates one technique for using initialized parameters to prune out candidate layers that are unlikely to be useful. Specifically, FIG. 4 shows a scenario where multiple operations can be initialized together by deriving an aggregate candidate layer 402 from a parent model 210. Generally, aggregate candidate layer 402 represents multiple candidate layers that each share connectivity to the parent model, but perform different operations. As discussed more below, FIG. 4 offers an alternative to adding all candidate layers to parent models to obtain the child models, or randomly selecting candidate layers. Note that, for brevity, FIG. 4 omits layer 212 which was shown in FIGS. 2 and 3.

A specific algorithm for pruning candidate layers follows. For each input $x_{in,i}$, the possible operations to $x_{in,i}$ can be instantiated as $op_{i,1}, \ldots, op_{i,k}$, where k is the number of possible operations. In FIG. 4, these inputs are provided by layers 213 and 214, for example. Given J inputs $x_{in,i}$, this gives a total of Jk tensors $o_1, o_2, \ldots, o_{Jk}$. These operations can be simultaneously trained together. Once trained, a subset of the operations can be summed together to finalize an aggregate candidate layer operation 404 via the formula $x_c$ as $x_c = \text{select}(o_1, \ldots, o_{Jk}) = \sum_{j=1}^{Jk} \omega_j o_j$.

Once trained, aggregate candidate layer 402 includes different weights for edges connected to different operations. Thus, the aggregate candidate layer can be conceived as multiple initialized candidate layers with different sets of weights for edges connecting different operations. These weights can be input to a feature selection technique to select one or more of the candidate layers to use in child models, and likewise to prune one or more other candidate layers so that they are not used in child models. This feature selection process is represented in FIG. 4 by select operation 406. Note that FIG. 4 also shows employing stop-forward operation 408 and stop-gradient operations 410 and 412 in a manner similar to that discussed above with respect to FIG. 3.

One approach to achieve sparse feature selection in select operation 406 is to linearly combine the choices $o_1, \ldots, o_{Jk}$ and use L−1 norm regularization, such as least absolute shrinkage and selection operator ("lasso"), on the linear weights. The sparsity can be enforced by adding the following regularization to the overall loss:

$$\lambda_{out} \sum_{j=1}^{Jk} |\omega_j|$$

where $\lambda_{out}$ is a parameter associated with target layer 215 ($x_{out}$) to manage the level of sparsity. Another alternative is to replace the linear loss with square loss as follows:

$$\min_{\substack{o_1, \ldots, o_{Jk} \\ \omega_1, \ldots, \omega_{Jk}}}, \frac{1}{2} E\left[\left\|-\frac{\partial l}{\partial x_{out}} - \sum_{j=1}^{Jk} \omega_j o_j \right\|_2^2\right] + \lambda_{out} \sum_{j=1}^{Jk} |\omega_j|$$

Recall that, in some implementations, $$x_c = \text{select}(o_1, \ldots, o_{Jk}) = \sum_{j=1}^{Jk} \omega_j o_j,$$

and thus the previous equation is equivalent to:

$$\min_{\substack{o_1, \ldots, o_{Jk} \\ \omega_1, \ldots, \omega_{Jk}}}, E\left[\left(\frac{\partial l}{\partial x_{out}}, x_c\right) + \frac{1}{2} \|x_c\|_2^2\right] + \lambda_{out} \sum_{j=1}^{Jk} |\omega_j|$$

Viewed from one perspective, the implementations discussed above employ feature selection and learned parameter sharing to initialize a combinatorial number of candidate layers and select a subset of them to include in child models for further training. This approach can favor selection of candidate layers that are likely to improve model performance, and disfavor selection of candidate layers that are unlikely to improve model performance. As a consequence, fewer total child models need to be trained for evaluation as potential parent models, and the child models that are trained are more likely to produce offspring that exhibit desirable performance.

Child Model Training

After initialization, a given child model can include learned parameters inherited from the parent model and also initialized parameters for any candidate layers included in that child model. As discussed above, block 110 of method 100 can include training child models as a whole, e.g., the candidate layers can be trained together with the rest of the parent model. This can be viewed as a "warm start" technique, where the child model has initialized candidate layer parameters and inherited parent model parameters at the start of training, both of which can be further modified when training a given child model as a whole.

Figure 5:
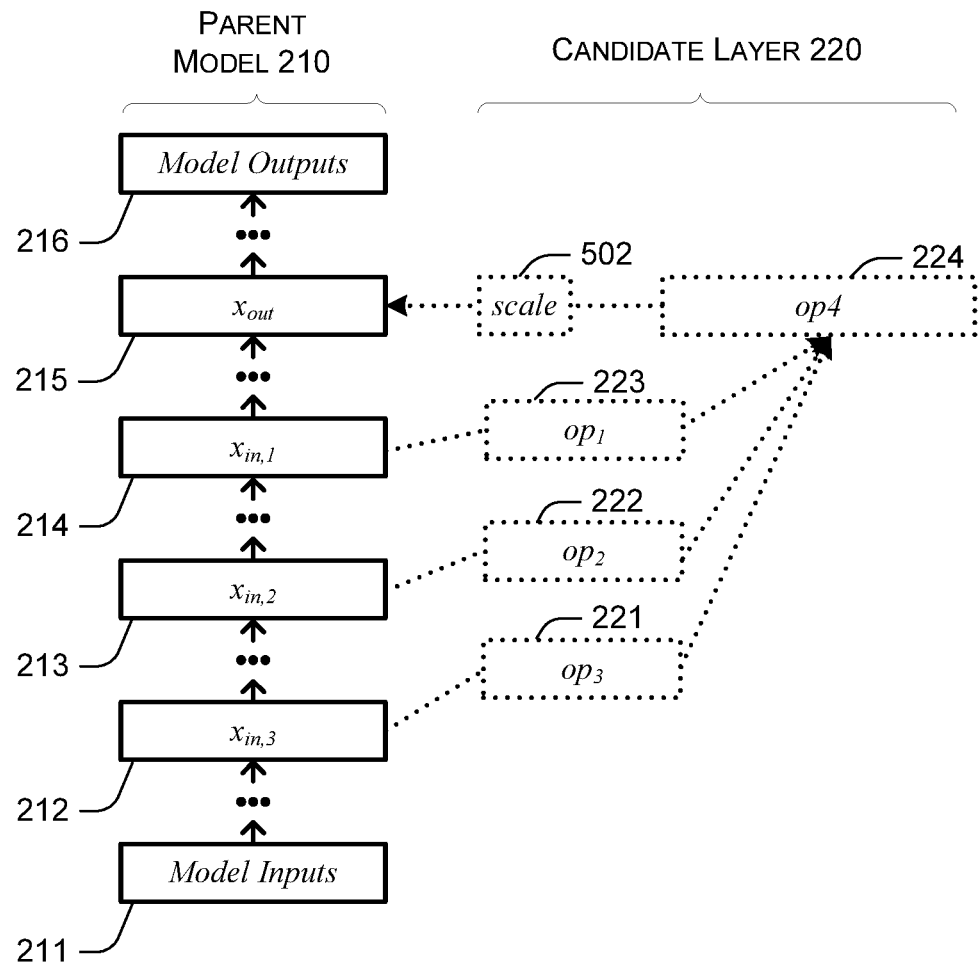
FIG. 5 illustrates an example approach for training a child model, consistent with some implementations of the present concepts.

FIG. 5 illustrates an example approach for training a child model. In FIG. 5, the stop-gradient operations on the inputs can be removed. In addition, the stop-forward operation can be replaced with a scalar multiplier 502. The scalar is trainable and can be initialized to be zero. Thus, immediately after initialization, the child models represent the same functions as the parent models. Accordingly, the child model has a different structure than the parent model, but the functionality of the parent model is preserved. The children models are then trained starting from the combination of parent parameters and initialized candidate parameters, as the scalar multiplier can change over time and the added candidate layer slowly begins contributing to the target layer and the subsequent outputs of the model. This approach can prevent the candidate layers from destabilizing the learned parameters inherited from the parent model, which may be close to optimal given that the parent model has been fully trained.

Note that some implementations may omit the sg and sf operations shown in FIG. 3 and instead immediately allow the candidate layers to affect the parent model while the candidate layers are being trained. Using sf-sg as pre- and post-fix of the candidate layer as shown in FIG. 3 can cause the candidate layers to converge faster. However, this can involve formulation of additional objectives for the candidates during initialization.

On the other hand, allowing values to freely flow between parent and candidate layers allows the new candidate layers to directly contribute to fitting the final loss. However, the initial values for the candidate layers could be too far away from optimal in comparison to models in the parent, and this could negatively affect the parent model parameters. An alternative approach to addressing this issue is to use a learning rate for initializing the candidate layers that is much smaller than that used in training the parent model (0.1~0.02 times the original).

Evaluating and Designating Child Models as Parents

As noted previously, certain child models are added to the parent model pool at block 114 of method 100. One approach for deciding which child models to add to the parent model pool involves using one or more criteria to predict which child models are likely to produce offspring that, in subsequent iterations, will exhibit improvements relative to previously-discovered models. Generally, the criteria can consider factors such as the loss of a given child model as well as the computational effort to train a given child model. Higher loss implies a lower accuracy during model validation, and higher cost implies longer training times on a training data set. Child models that exhibit relatively low loss and low training effort can be favored for inclusion in the parent model pool.

Figure 6:
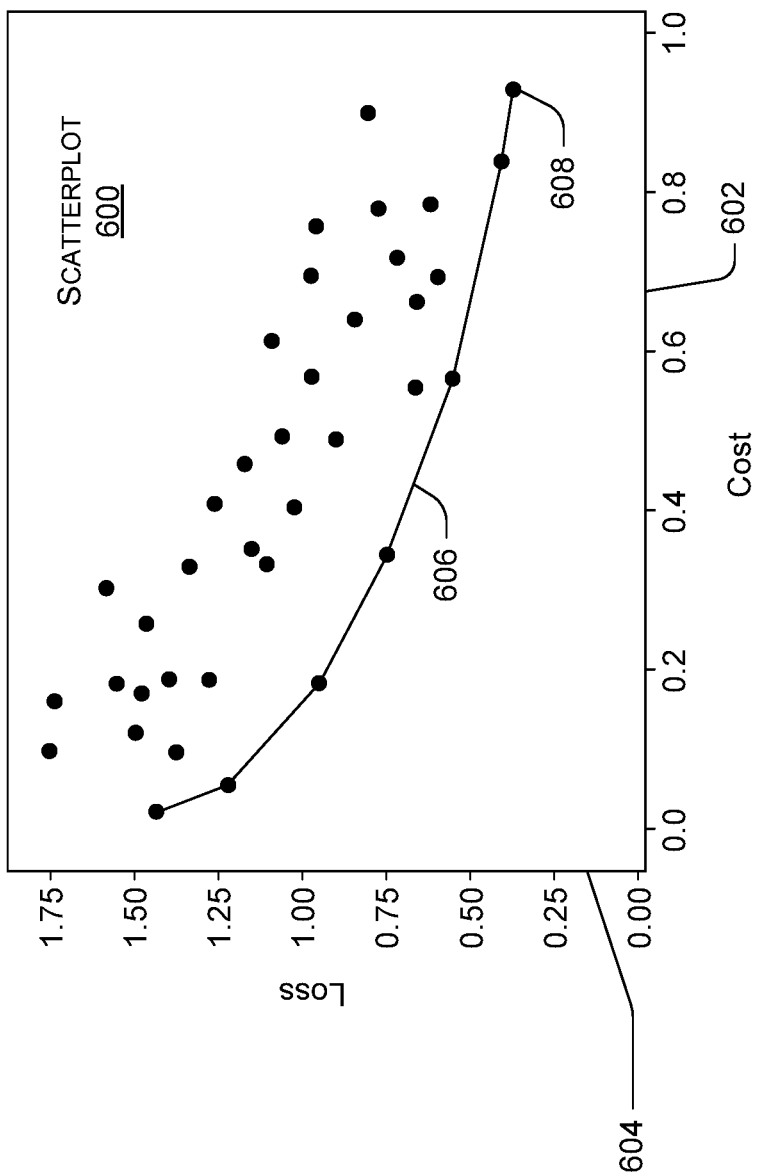
FIGS. 6-8 illustrate scatterplots associated with consecutive iterations of an iterative model-growing process, consistent with some implementations of the present concepts.

One specific approach to selecting child models for the parent pool is shown herein with respect to FIG. 6. This figure illustrates an example scatterplot 600 for various trained models. For each child model that completes training, the computational cost to train that child model can be computed and plotted on x-axis 602. In addition, the loss of that child model can be computed and plotted on y-axis 604. Once all models for a given iteration have been plotted, a lower convex hull 606 can be computed from the plotted values. Note that the computational cost can be calculated as a value such as GPU-days that reflects an amount of time needed to train the model on standardized hardware (e.g., a specific model of GPU). In other implementations, the computational cost reflects the test-time cost, e.g., the number of operations involved in using a given model to make a prediction, irrespective of training-specific values such as the number of training epochs and/or data augmentations involved in training. The computational cost can be normalized to a number between 0 and 1, as shown in FIG. 6.

The lower convex hull 606 can be used as a mechanism to decide whether a given child model is added to the parent model pool. For example, a child model on the lower convex hull can be added to the parent model pool with a probability defined using the following specific algorithm. If $m_1$ and $m_2$ are two adjacent models on the hull, with computational costs $c_1$ and $c_2$ ($c_1 < c_2$), then the probability weight of $m_1$ can be set proportionally to $c_2 - c_1$. The most accurate model, which has no following model on the curve, can be selected for inclusion within the parent model pool with probability 0.5. In FIG. 6, the most accurate model is model 608, since this model has the lowest loss.

Generally, a lower convex hull is a subset of the Pareto frontier, and thus another approach is to select child models on the Pareto frontier for inclusion into the parent pool. Either approach can provide good performance for selecting child models to add to the parent model pool. One way to view the lower convex hull and/or the Pareto frontier is as follows. A given model on the lower convex hull or Pareto frontier cannot be improved with respect to one criteria by moving to another model on the lower convex hull/Pareto frontier without degrading the other criteria.

Note that the same models may have different validation errors due to randomness in forming stochastic gradients. As a consequence, the lower convex hull or Pareto frontier can be relaxed with a multiplicative bandwidth. Thus, a child model whose validation error is within $(1+\gamma)$ times the lower convex hull validation error at the same computational cost can considered to be on the lower convex hull and can be chosen as a parent. Some implementations can set $\gamma=0.025$. This approach allows certain child models that are proximate to the lower convex hull, yet not strictly located thereon, to still be designated as parent models.

Other approaches may also be used to allow child models that have locations within a predetermined vicinity of the lower convex hull to be selected as parent models. For example, some implementations can define a threshold distance from the lower convex hull, and allow child models within the threshold distance of the lower convex hull to be selected as parent models. This is just one of various approaches that can be used to select a subset of one or more child models as a parent model, based on one or more criteria.

FIG. 6 shows models that have completed training as black dots. For purposes of explanation, assume that FIG. 6 represents the state of scatterplot 600 after iteration N. One or more of the child models on or near lower convex hull 606 can be selected as parent models for a subsequent iteration N+1, where additional candidate layers can be added and initialized to form further child models, as discussed above.

Figure 7:
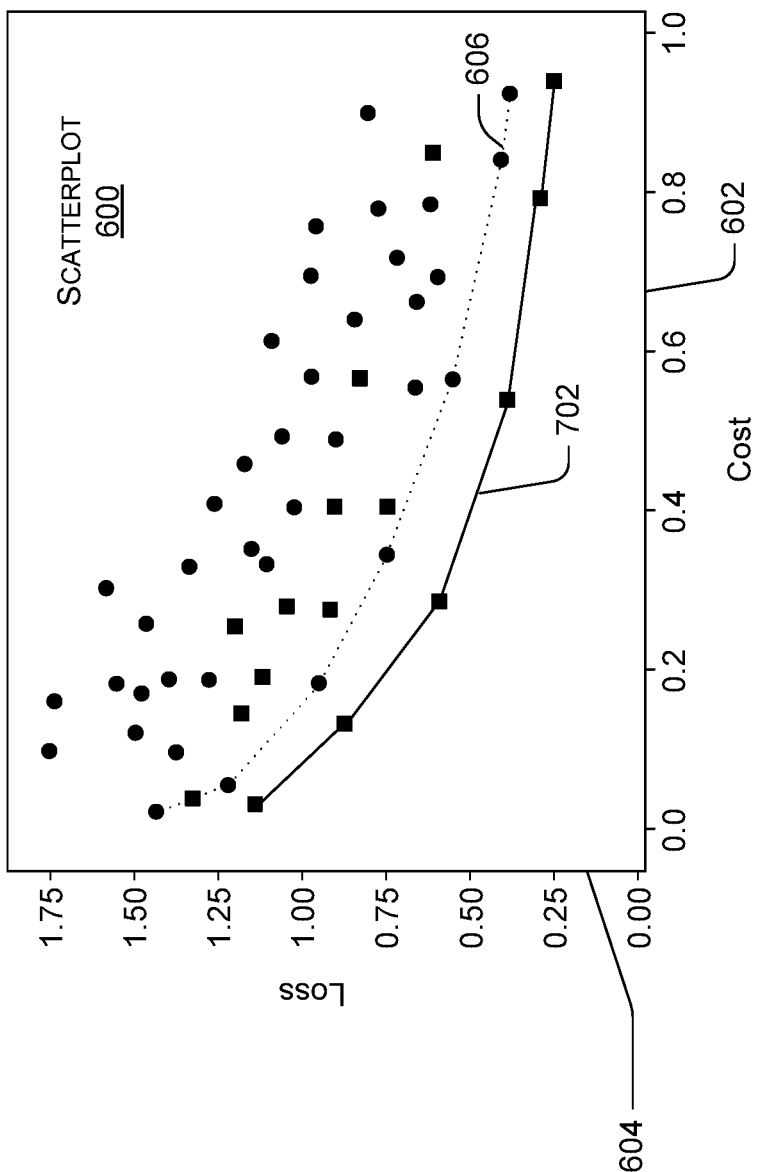

FIG. 7 shows scatterplot 600 in a subsequent state after iteration N+1. Child models trained during iteration N+1 are shown in FIG. 7 using squares. A new lower convex hull 702 can be computed. Previous lower convex hull 606 is shown in dotted lines to illustrate movement of the lower convex hull downward in iteration N+1.

Figure 8:
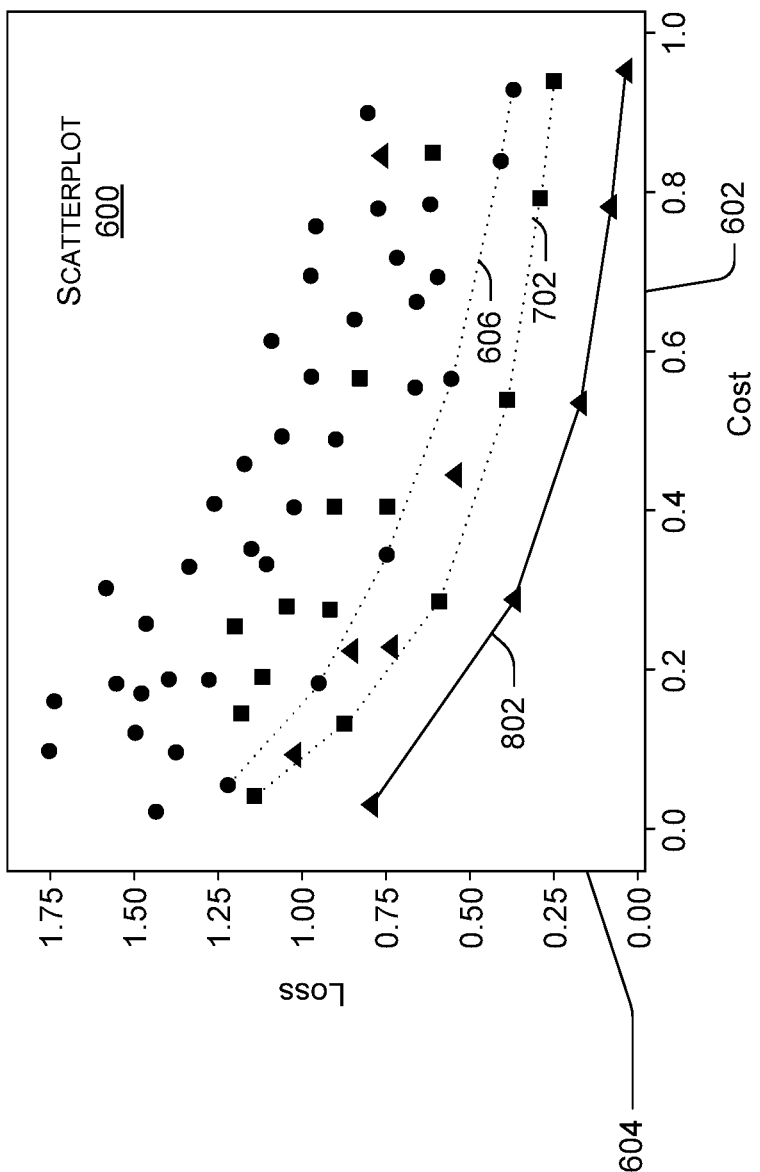

Again, one or more of the child models in or near lower convex hull 702 can be selected for a subsequent iteration N+2. Child models trained during iteration N+2 are shown in FIG. 8 as triangles. A new lower convex hull 802 can be computed, and previous lower convex hulls 606 and 702 are shown in dotted lines to illustrate their position relative to lower convex hull 802.

One way to view the approach shown in FIGS. 6-8 is a greedy approach to finding cost-efficient predictors. Note that this is a multi-objective approach, considering both computational cost of training/validation and also the model accuracy. Alternative implementations might use different and/or additional criteria, e.g., multi-dimensional plots of three or more criteria, an objective function defined over one or more criteria, etc.

The approach set forth above generally grows networks using a randomized approach. However, instead of a purely random approach which might be computationally infeasible, the approach is guided by prediction criteria that tends to favor using known good models as a basis for further modification. As noted previously, training a model from scratch can be very computationally intensive. For example, a training data set might include millions of training data items, and a given model might need to be trained over several training epochs before convergence. A training epoch can involve one forward propagation and one back-propagation operation through an entire model for each data item in the training data set.

The approach set forth above offers various benefits relative to conventional approaches for automated model generation. Note that not every child model is used to derive candidate layers for subsequent training. Rather, by using a subset of child models that occur along the lower convex hull as new parent models, the disclosed implementations start each new iteration with child model structures that inherit the parent model structure of known good models. This allows subsequent iterations to proceed without training models that occupy a significant portion of the search space that is far away from the lower convex hull, and can save a tremendous amount of training time. In addition, by using not only accuracy but training cost as a criterion for selecting which child models to use as new parent models, the disclosed implementations disfavor the generation of new models that are more computationally intensive. This, in turn, reduces the training time for training not only of those models, but child models derived therefrom.

In addition, recall that candidate layer initialization can be performed on child models that inherit not only the structure of the parent model, but also learned parameters of the parent model. As a consequence, parameters of new candidate layers can be initialized relatively quickly to reasonable values. Moreover, this allows for "warm start" training of the child model as a whole. This can speed convergence, e.g., by requiring far fewer training epochs or training samples than would be the case if each child model were fully trained from scratch.

In addition, recall that shared edges between any two child models can be initialized and trained together. Considering that the child models are derived from a shared pool of parent models, the likelihood of sharing edges is relatively high. Thus, significant training time can be saved relative to alternatives where shared edges are initialized and trained separately for each child model.

Recall that previous techniques for automated generation of machine learning models either suffered from computationally infeasible training burdens, or only considered models within a very restricted search space. Taken together, the benefits noted above enable automated generation of large, accurate machine learning models from a relatively unconstrained search space, without imposing inordinate computational burdens on the computing resources used to generate the models.

Example Processing Flow

Figure 9:
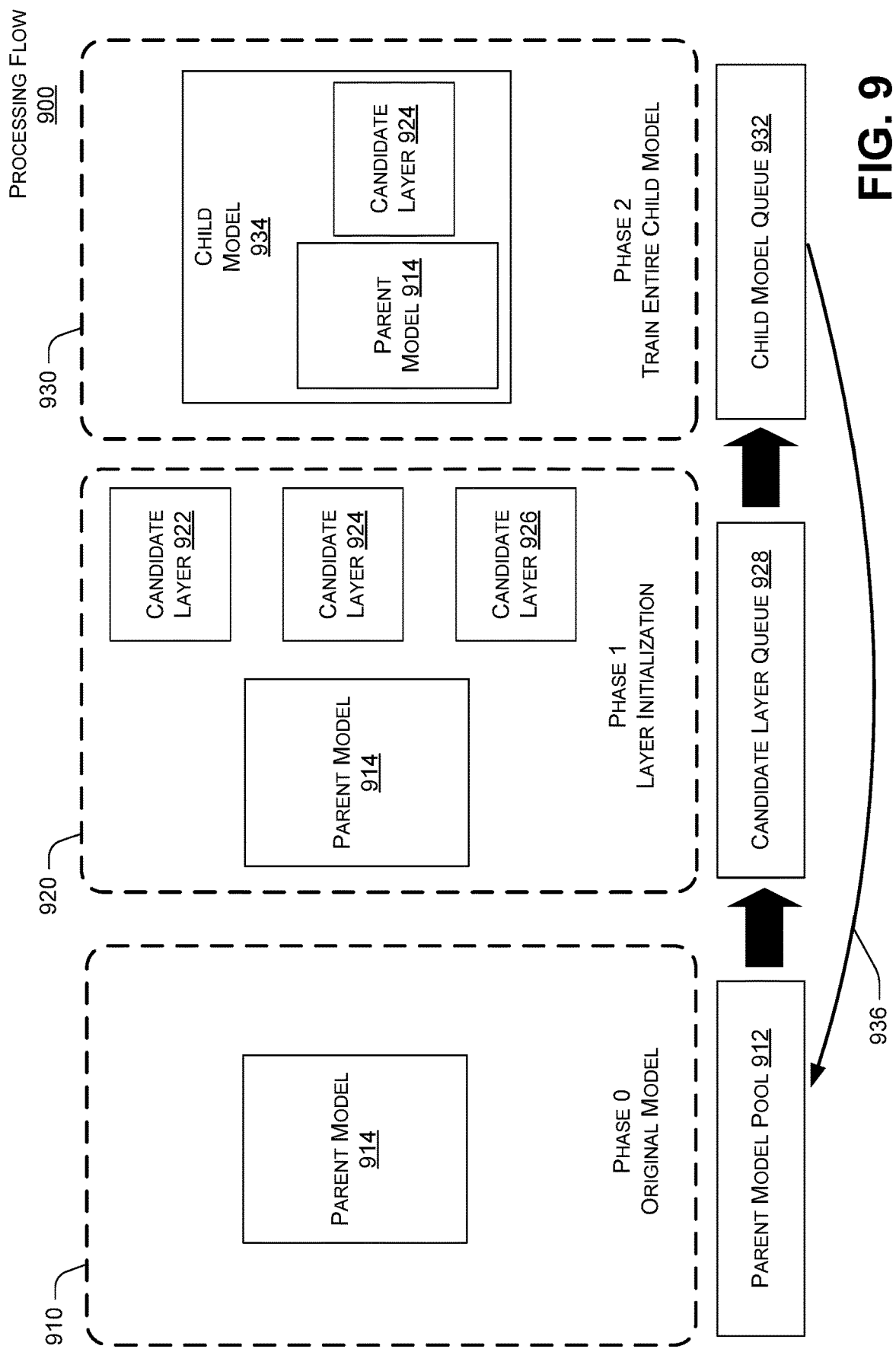
FIG. 9 illustrates an example processing flow for automated generation of machine learning models, consistent with some implementations of the present concepts.

FIG. 9 provides a high-level overview of a processing flow 900 for incrementally growing a model structure. The processing flow illustrates how a pool of parent models can be grown iteratively. This processing flow is one example of an approach for assigning certain tasks to worker processes, such as virtual machines. For example, the processing flow may be suited to distributed systems or server farms where a hypervisor or operating system is scheduling new jobs over time as worker processes become available.

In phase 910, a parent model pool 912 is determined. For example, in some cases, a human or automated technique can choose one or more models for the pool based on known performance of the models. For simplicity, assume the pool includes a single model 914 upon initialization.

In phase 920, candidate layers are initialized from the parent models. For example, FIG. 9 shows candidate layers 922, 924, and 926. As noted, each candidate layer can be added to the parent model pool 912. The candidate layers can be added to a candidate layer queue 928. When a given worker process becomes available, the worker process can pull a candidate layer from the candidate layer queue and initialize that candidate layer as discussed herein, e.g., by performing several initial iterations of training.

Once initialized, a subset of the candidate layers can be selected for inclusion in a child model queue 932 for training in phase 930. An available worker process can pull a given child model from the child model queue for training in phase 930. FIG. 9 shows one such child model 934 in phase 930 as including candidate layer 924, but not candidate layer 922 or 926. This represents the idea that candidate layers 922 and/or 926 have been pruned out in preceding phase 920, e.g., as discussed in the feature selection implementations mentioned above.

As previously mentioned, child models are not necessarily trained from scratch, but can be trained starting from the learned parameters of the parent model and also initialized parameters determined in phase 920 when initializing the candidate layers that are added to the child models. Furthermore, note that multiple children models can be trained jointly together as part of one larger model, as also discussed above.

In phase 930, certain child models from the child model queue 932 can be chosen to add to parent model pool 912, as shown by arrow 936. As previously discussed, the child models added to the parent model pool can be chosen based on various criteria. For example, some implementations may evaluate the trained child models on validation data sets and determine respective loss for each child model, and the loss can be used as a criterion for which child models are added to the parent model pool. Alternatively and/or additionally, the computational expense of training a given child model can be used as a criterion to determine whether that child model is added to the parent model pool. Other approaches can leverage formal computations of the net expected value of adding a child model to the parent model pool based on a consideration of the computational expense and projections computed about the expected value of the addition. Once the parent model pool has been updated, processing can return to phase 910 for subsequent iterations.

Example System

Figure 10:
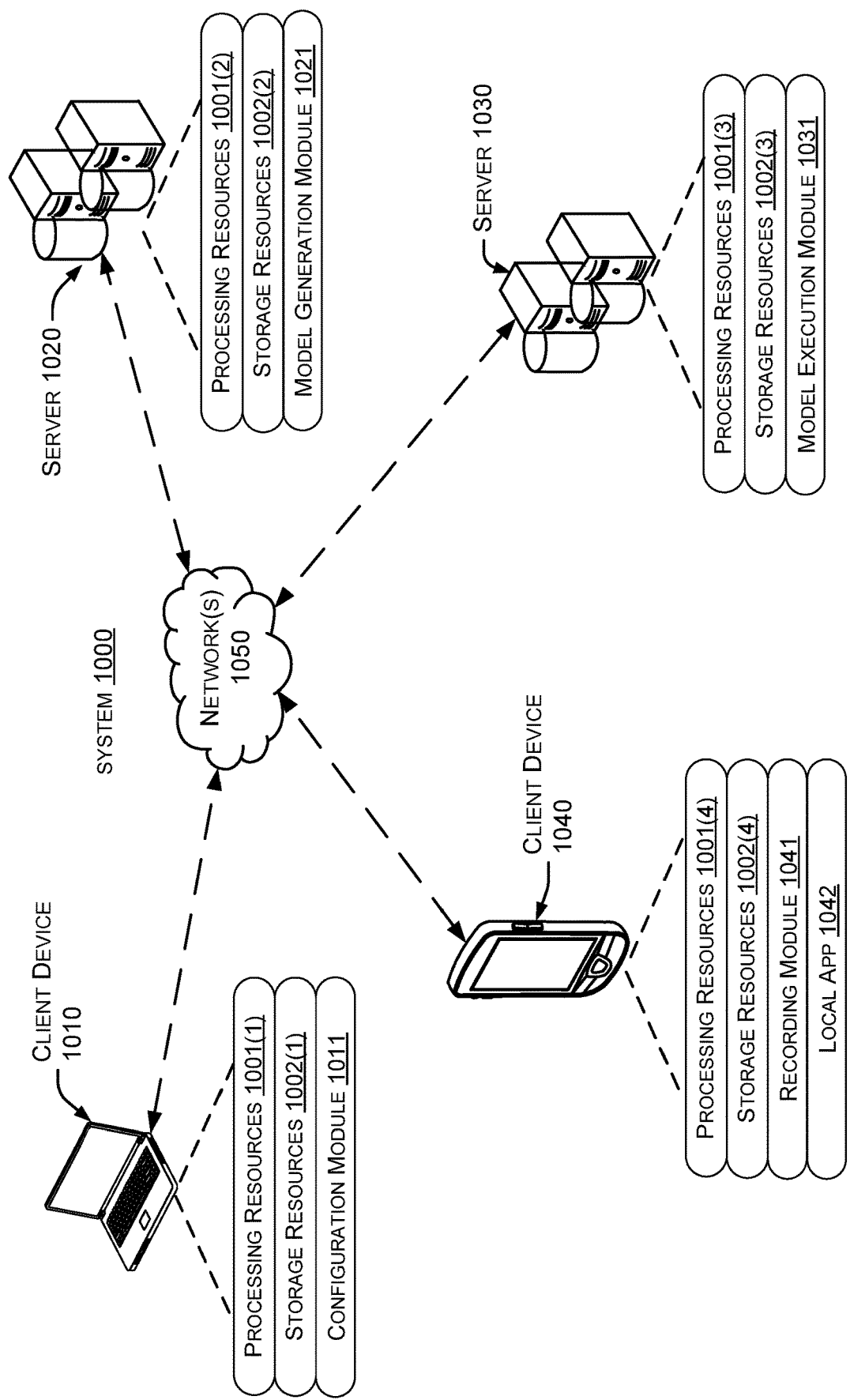
FIG. 10 illustrates an example system, consistent with some implementations of the present concepts.

The present implementations can be performed in various scenarios on various devices. FIG. 10 shows an example system 1000 in which the present implementations can be employed, as discussed more below.

As shown in FIG. 10, system 1000 includes a client device 1010, a server 1020, a server 1030, and a client device 1040, connected by one or more network(s) 1050. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 10, but particularly the servers, can be implemented in data centers, server farms, etc.

Certain components of the devices shown in FIG. 10 may be referred to herein by parenthetical reference numbers. For the purposes of the following description, the parenthetical (1) indicates an occurrence of a given component on client device 1010, (2) indicates an occurrence of a given component on server 1020, (3) indicates an occurrence on server 1030, and (4) indicates an occurrence on client device 1040. Unless identifying a specific instance of a given component, this document will refer generally to the components without the parenthetical.

Generally, the devices 1010, 1020, 1030, and/or 1040 may have respective processing resources 1001 and storage resources 1002, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 1010 can include a configuration module 1011 that can interact with a model generation module 1021 on server 1020. Generally speaking, the configuration module can provide certain configuration parameters to the model generation module. The model generation module uses these configuration parameters to perform model generation functionality as discussed herein. In particular, the model generation module can perform method 100 based on the configuration parameters. As noted above, the iterative model-growing process can involve modifying parent models to obtain child models, selecting candidate layers to include in the child models based at least on weights learned in an initialization process of the candidate layers, and outputting a final model selected from the child models. The model generation module can include various sub-modules (not shown) for each block of method 100.

The model generation module 1021 can output a final model to server 1030. Model execution module 1031 can execute the final model in response to received inputs. For example, the recording module 1041 on client device 1040 can record data such as images or speech for processing by the final model, and a local application 1042 can upload the recorded data to server 1030 for processing. The model execution module can process the uploaded data using the final model, and provide model outputs to the local application for further processing.

Example Graphical Interface

Figure 11:
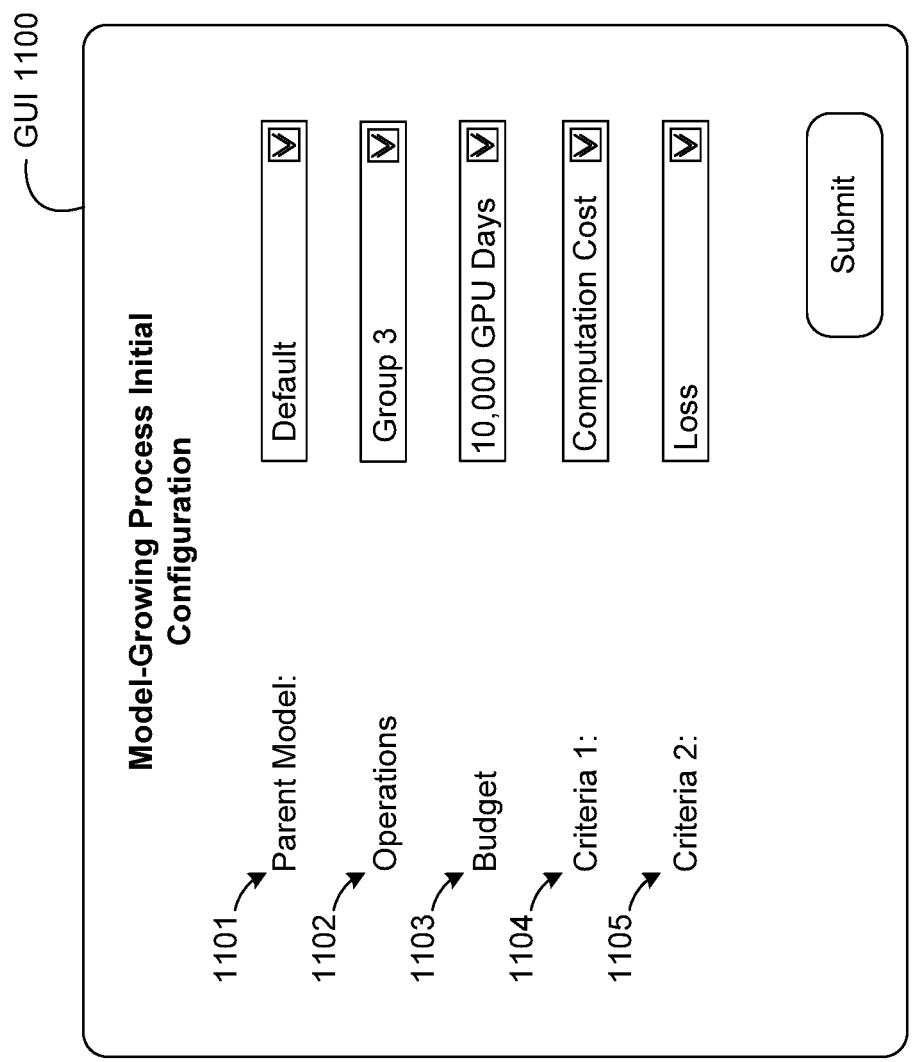
FIG. 11 illustrates an example graphical user interface, consistent with some implementations of the present concepts.

As noted above, the configuration module 1011 on client device 1010 can provide initial configuration parameters to the model generation module 1021. The model generation module 1021 can perform method 100 according to the configuration parameters provided by the configuration module. FIG. 11 illustrates an example configuration graphical user interface ("GUI") 1100 that can be presented on client device 1010 for a user to define these configuration parameters.

Parent model element 1101 allows the user to specify what type of initial parent model or models should be used to start the model-growing process. In FIG. 11, the user is shown having selected a default parent model. For example, the model generation module 1021 may provide a default neural network structure for use as a generic initial parent model. Other options can include a randomly-generated model, where the module generation module selects a random model structure for use as the initial parent. Another option is for the user to navigate to an existing model that is known to provide relatively good performance for a specific task. In this case, the configuration module 1011 can upload the designated model to the model generation module for use as the initial parent model.

Operations element 1102 allows the user to specify what types of operations are considered by the model generation module 1021. For example, the model generation module can provide various options for groups of enumerated operations that can be selected for candidate layers. A first option, group 1, might define two operations, a single convolution operation (e.g., 5×5) and a single pooling operation (e.g., max pooling). A second option, group 2, might define a total of four possible operations—two convolution operations, e.g., 5×5 and 7×7, and two pooling operations, average pooling and max pooling. A third option, group 3, might define a total of seven possible operations—1×1, 3×3, 5×5, and 7×7 convolutions, average and max pooling, and an identity operation. The enumerated operations may also have predetermined or selectable operation parameters, e.g., adjustable window sizes, strides, etc.

Budget input element 1103 allows the user to specify a computational budget for model generation. For example, the user might specify a budget of 10,000 GPU-days, and the model generation module 1021 can use this budget as a stopping condition at decision block 116 of method 100. Alternative implementations might use other metrics, such as a number of processing operations, a number of virtual machines, an amount of time, etc., as computational budgets.

Criteria 1 element 1104 allows the user to specify a first criterion for evaluating models, and criteria 2 element 1105 allows the user to specify a second criteria. In FIG. 11, these criteria are shown as computational cost and loss, respectively, as discussed above. However, users may wish to specify other criteria, such as the overall size of the model structure, number of connections, the total number of learnable parameters of the model, etc. For resource-constrained applications such as running the model on a mobile device or an Internet of Things (IoT) device, the size of the model in bytes can be an important criterion, as these devices tend to have limited storage and/or memory capacities. In addition, the computational time to execute the model can also be a useful criterion in these scenarios, as these devices may have constrained processing capabilities that can result in the user perceiving latency when a given model takes a long time to execute.

Note that the configuration parameters shown in FIG. 11 are merely exemplary, and various other implementations are contemplated. For example, in some cases, users can specify connectivity parameters. As an example, a user can specify that candidate layers receive inputs from a specified number of previous layers, or a varying (e.g., random) number of previous layers. As another example, the user might specify whether skip connections are allowed, e.g., where one layer may not provide inputs to an immediately-subsequent layer but instead may skip the immediately-subsequent layer and connect to another subsequent layer. Users could also specify a densenet architecture where each layer is connected to all preceding layers in the model.

Also, note that some implementations may provide one or more GUIs to show progress of method 100. For example, some implementations may generate GUIs showing scatterplot 600 changing across different iterations of model growth in a manner similar to that shown in FIGS. 6-8. Other implementations may show graphical representations of individual models and/or candidate layers as they are generated.

Example Applications

The techniques discussed herein can be used for various applications, without limitation. Nevertheless, the following presents some specific examples for the sake of illustration.

As a first example, assume that an entity wishes to market an application that tags all of the user's friends in their photo collection. This entity may have a preexisting model that they currently use for this purpose, and that model may be executed by model execution module 1031 on server 1030 on photos provided by local application 1042 on client device 1040. However, the entity may feel that the preexisting model is not sufficiently accurate and can give an unsatisfactory user experience under some circumstances.

First, the entity can upload the preexisting model to model generation module 1021 on server 1020, and can configure various initial parameters as discussed above. Next, the model generation module can iteratively grow the preexisting model until a stopping condition is reached, and export the final model to the server 1030. Server 1030 can then replace the initial model with the received final model and continue tagging user photos as discussed.

As one alternative, the client device might provide recorded audio data for speech transcription by the final model. As another alternative, the client device might provide text in a first language for translation to a second language by the final model. As additional examples, the final model can perform scene segmentation on video, object detection on images or video (e.g., identifying faces, vehicles, etc.), performing grammar parsing on text, etc.

As yet another example, the final model may be used for mapping documents and queries into a semantic vector. In this case, server 1030 might provide search engine functionality that uses vector distances between indexed documents and received queries to rank search results for a user of the client device 1040. More generally, the final model can perform any suitable task for which training data is available, including, but not limited to, classification, machine translation, and pattern recognition tasks.

Also, some implementations may allow entities to provide data sets for training, validation, and/or testing. For example, a first entity might send a data set from client device 1010 to a second entity that controls server 1020. The second entity can generate a final model using the data set provided by the first entity. In some cases, the second entity can provide the final model to the first entity, e.g., for execution on server 1030 by the first entity. In other cases, the second entity does not provide the model itself, but instead allows the first entity to call the model. In this case, the second entity might control both server 1020 and server 1030, and/or implement both the model generation and execution on the same device.

In addition, note that the term "final model" is only used herein to imply that a given child model is designated for practical use in an application. In some implementations, a final model output and used by an entity may also be used as an initial parent model for subsequent iterations of the model-growing process described herein. In some cases, an entity will obtain new data over the course of using a given final model, and the new data can be used as training/validation/test data for the subsequent iterations of the process. This can result in a new final model being output, which can then be used for some time as further new data is obtained, and the process can be continually repeated over the lifetime of a given practical application targeted by a given entity.

In addition, note that the disclosed implementations focus on examples where candidate layers are added to model structures. However, in some cases, other types of candidate components can be used instead of layers. Generally, candidate components can be implemented using any type of mathematical and/or logical functionality, ranging from simple arithmetic or Boolean operators to more complex, trainable modules.

Device Implementations

As noted above with respect to FIG. 10, system 1000 includes several devices, including a client device 1010, a server 1020, a server 1030, and a client device 1040. As also noted, not all device implementations can be illustrated and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1050. Without limitation, network(s) 1050 can include one or more local area networks (LANs), wide area networks (WANs), the Internet, and the like.

ADDITIONAL EXAMPLES

Various device examples are described above. Additional examples are described below. One example includes a method performed on a computing device, and the method can include performing two or more iterations of an iterative model-growing process. The iterative model-growing process can include selecting a particular parent model from a parent model pool of one or more parent models, generating a plurality of candidate layers, and initializing the plurality of candidate layers while reusing learned parameters of the particular parent model. The iterative model-growing process can also include selecting particular candidate layers to include in child models for training, and respective child models can include the particular parent model and one or more of the particular candidate layers. The iterative model-growing process can also include training the plurality of child models to obtain trained child models, evaluating the trained child models using one or more criteria, and, based at least on the evaluating, designating an individual trained child model as a new parent model and adding the new parent model to the parent model pool. The method can also include selecting at least one trained child model as a final model after two or more iterations, and outputting the final model.

Another example can include any of the above and/or below examples where the method further includes determining computational costs of training or testing the child models and using the computational costs as a first criterion when evaluating the trained child models.

Another example can include any of the above and/or below examples where the method further includes determining losses associated with the trained child models and using the losses as a second criterion when evaluating the trained child models.

Another example can include any of the above and/or below examples where the method further includes plotting the child models on a graph having a first axis reflecting the computational costs and a second axis reflecting the losses, and selecting the new parent model based at least on a corresponding location of the new parent model on the graph.

Another example can include any of the above and/or below examples where the method further includes determining at least one of a lower convex hull or a Pareto frontier on the graph, and selecting the new parent model based at least on proximity of the new parent model to the lower convex hull or the Pareto frontier.

Another example can include any of the above and/or below examples where the selecting includes identifying a subset of the trained child models that are within a predetermined vicinity of the lower convex hull or the Pareto frontier, determining respective probabilities for the subset of the trained child models, and selecting the new parent model based at least on the respective probabilities.

Another example can include any of the above and/or below examples where generating an individual candidate layer includes selecting a target layer from the particular parent model to receive outputs of the individual candidate layer, selecting one or more input layers from the particular parent model to provide inputs to the individual candidate layer, and selecting a particular operation to be performed by the individual candidate layer on the inputs.

Another example can include any of the above and/or below examples where selecting the particular operation includes defining a group of operations and randomly selecting the particular operation from the group of operations.

Another example can include any of the above and/or below examples where the method further includes selecting the target layer and at least one input layer randomly from the particular parent model Another example can include any of the above and/or below examples where the final model is a neural network.

Another example includes a system that includes a hardware processing unit and a storage resource storing computer-readable instructions which, when executed by the hardware processing unit, cause the hardware processing unit to perform an iterative model-growing process that involves modifying parent models to obtain child models. The iterative model-growing process can include selecting candidate layers to include in the child models based at least on weights learned in an initialization process of the candidate layers. The computer-readable instructions can also cause the hardware processing unit to also output a final model selected from the child models.

Another example can include any of the above and/or below examples where the computer-readable instructions, when executed by the hardware processing unit, cause the hardware processing unit to generate different candidate layers that share connectivity to the parent models and perform different operations, and initialize the different candidate layers together to obtain different weights for the different candidate layers.

Another example can include any of the above and/or below examples where the computer-readable instructions, when executed by the hardware processing unit, cause the hardware processing unit to select individual candidate layers for inclusion in the child models, based at least on the different weights of the different candidate layers.

Another example can include any of the above and/or below examples where the computer-readable instructions, when executed by the hardware processing unit, cause the hardware processing unit to perform a feature selection technique on the different weights of the different candidate layers to select the individual candidate layers for inclusion in the child models.

Another example can include any of the above and/or below examples where the feature selection technique includes least absolute shrinkage and selection operator (LASSO).

Another example can include any of the above and/or below examples where the different operations includes convolution operations and pooling operations.

Another example can include any of the above and/or below examples where the computer-readable instructions, when executed by the hardware processing unit, cause the hardware processing unit to train the final model using training data for at least one classification, machine translation, or pattern recognition task, and provide the final model for execution, the final model being adapted to perform the at least one classification, machine translation, or pattern recognition task.

Another example includes a computer-readable storage medium storing instructions which, when executed by a processing device, cause the processing device to perform acts that include performing two or more iterations of an iterative model-growing process. The iterative model-growing process can include: selecting a particular parent model from a parent model pool of one or more parent models, initializing a plurality of candidate layers, selecting a plurality of child models for training, respective child models inheriting a structure of the particular parent model and including at least one of the candidate layers, training the plurality of child models to obtain trained child models, and designating an individual trained child model as a new parent model based at least in part on one or more criteria and adding the new parent model to the parent model pool. The acts can further include selecting at least one trained child model as a final model after two or more iterations, and outputting the final model Another example can include any of the above and/or below examples where the acts further include concurrently initializing a plurality of candidate layers to obtain initialized parameters and selecting individual candidate layers to include in individual child models based at least on the initialized parameters.

Another example can include any of the above and/or below examples where the acts further include randomly selecting operations from a group of enumerated operations to include in the plurality of candidate layers.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
    performing two or more model-growing iterations of an iterative model-growing process, the iterative model-growing process comprising:
        selecting a particular parent model having a plurality of layers from a parent model pool of one or more parent models;
        inserting a plurality of candidate layers into the particular parent model and initializing the plurality of candidate layers to obtain learned weights for the candidate layers during training while the plurality of candidate layers are connected to the particular parent model, the plurality of candidate layers being initialized while maintaining weights of the plurality of layers of the particular parent model;
        based at least on the learned weights of the plurality of candidate layers, selecting less than all of the plurality of candidate layers as selected candidate layers to include in each child model of a plurality of child models for subsequent training, each respective child model including the plurality of layers of the particular parent model and one or more of the selected candidate layers;
        training the plurality of child models having the one or more selected candidate layers to obtain trained child models;
        determining computational costs of training or testing the trained child models; and
        based at least on the computational costs of training or testing the trained child models, selecting an individual trained child model as a new parent model and adding the new parent model to the parent model pool; and
    after the two or more model-growing iterations, selecting at least one trained child model as a final model and outputting the final model.

2. The method of claim 1, wherein the determining computational costs includes determining training costs of training the trained child models and determining testing costs of testing the trained child models.

3. The method of claim 2, further comprising:
    determining losses associated with the trained child models; and
    selecting the individual trained child model as the new parent model and adding the new parent model to the parent model pool based at least on the losses.

4. The method of claim 3, further comprising:
    plotting the trained child models on a graph having a first axis reflecting the computational costs and a second axis reflecting the losses; and
    selecting the new parent model based at least on a corresponding location of the new parent model on the graph.

5. The method of claim 4, further comprising:
    determining at least one of a lower convex hull or a Pareto frontier on the graph; and
    selecting the new parent model based at least on proximity of the new parent model to the lower convex hull or the Pareto frontier.

6. The method of claim 5, wherein the selecting comprises:
    identifying a subset of the trained child models that are within a predetermined vicinity of the lower convex hull or the Pareto frontier;

determining respective probabilities for the subset of the trained child models; and selecting the new parent model based at least on the respective probabilities.

7. The method of claim 1, wherein inserting an individual candidate layer comprises:

selecting a target layer from the particular parent model to receive outputs of the individual candidate layer;

selecting one or more input layers from the particular parent model to provide inputs to the individual candidate layer; and selecting a particular operation to be performed by the individual candidate layer on the inputs.

8. The method of claim 7, the selecting the particular operation comprising:

defining a group of operations; and randomly selecting the particular operation from the group of operations.

9. The method of claim 7, further comprising:

selecting the target layer and at least one input layer randomly from the particular parent model.

10. The method of claim 1, the final model being a neural network.

11. The method of claim 1, wherein the training the plurality of child models involves adjusting both the weights of the plurality of layers of the particular parent model and the learned weights of the selected candidate layers.

12. A system comprising:

a hardware processing unit; and a storage resource storing computer-readable instructions which, when executed by the hardware processing unit, cause the hardware processing unit to:

perform an iterative model-growing process comprising:

selecting a particular parent model having a plurality of layers from a parent model pool of one or more parent models;

inserting a plurality of candidate layers into the particular parent model and initializing the plurality of candidate layers to obtain learned weights for the plurality of candidate layers, the initializing being performed via training while maintaining weights of the plurality of layers of the particular parent model;

selecting specific candidate layers to include in child models for subsequent training, the specific candidate layers including less than all of the plurality of candidate layers and being selected from the plurality of candidate layers based at least on the learned weights obtained by the initializing; and training a plurality of child models to obtain trained child models, respective child models including the plurality of layers of the particular parent model and including at least one of the specific candidate layers selected from the plurality of candidate layers; and output a final model, the final model being selected from the plurality of child models.

13. The system of claim 12, wherein the plurality of candidate layers share connectivity to the particular parent model and perform different operations.

14. The system of claim 12, wherein the iterative model-growing process comprises:

adding individual child models to the parent model pool.

15. The system of claim 14, individual candidate layers performing different operations including at least convolution operations and pooling operations.

16. The system of claim 12, wherein the computer-readable instructions, when executed by the hardware processing unit, cause the hardware processing unit to:

perform a feature selection technique on the learned weights of the plurality of candidate layers to select the specific candidate layers for inclusion in the child models for subsequent training.

17. The system of claim 16, the feature selection technique comprising least absolute shrinkage and selection operator (LASSO).

18. The system of claim 12, wherein the computer-readable instructions, when executed by the hardware processing unit, cause the hardware processing unit to:

train the final model using training data for at least one classification, machine translation, or pattern recognition task; and provide the final model for execution, the final model being adapted to perform the at least one classification, machine translation, or pattern recognition task.

19. A computer-readable storage medium storing instructions which, when executed by a processing device, cause the processing device to perform acts comprising:

performing two or more model-growing iterations of an iterative model-growing process, the iterative model-growing process comprising:

selecting a particular parent model having a plurality of layers from a parent model pool of one or more parent models;

inserting a plurality of candidate layers into the particular parent model;

while maintaining weights of the plurality of layers of the particular parent model, initializing weights of the plurality of candidate layers via training while the plurality of candidate layers are connected to the particular parent model to obtain learned weights of the plurality of candidate layers;

selecting a subset of less than all of the plurality of candidate layers for subsequent training based at least on the learned weights of the plurality of candidate layers;

training a plurality of child models to obtain trained child models, respective child models inheriting the plurality of layers of the particular parent model and including at least one candidate layer from the selected subset of less than all of the plurality of candidate layers; and designating an individual trained child model as a new parent model based at least in part on one or more criteria and adding the new parent model to the parent model pool; and after the two or more model-growing iterations, selecting at least one trained child model as a final model and outputting the final model.

20. The computer-readable storage medium of claim 19, the acts further comprising:

stabilizing other weights of the particular parent model when initializing the plurality of candidate layers while the plurality of candidate layers are connected to the particular parent model.

21. The computer-readable storage medium of claim 20, the acts further comprising:

randomly selecting operations from a group of enumerated operations to include in the plurality of candidate layers.

22. The computer-readable storage medium of claim 19, wherein the plurality of candidate layers are connected to specific layers of the particular parent model when initializing the weights of the plurality of candidate layers, and the subset of less than all of the plurality of candidate layers remain connected to the same specific layers of the particular parent model when training the child models.

* * * * *